United States Patent [19]
Nomura et al.

[11] Patent Number: 5,089,899
[45] Date of Patent: Feb. 18, 1992

[54] RECORDING MEDIUM PLAYING APPARATUS WHICH PERMITS CHANGES IN THE DISPLAY POSITION OF A REPRODUCED IMAGE

[75] Inventors: Satoru Nomura; Yoshihisa Nagai; Tetsuro Emi; Koji Miyashita; Hiroyuki Higuchi; Makoto Hijikata, all of Yamanashi, Japan

[73] Assignee: Pioneer Electronic Corporation, Tokyo, Japan

[21] Appl. No.: 449,193

[22] Filed: Dec. 13, 1989

[30] Foreign Application Priority Data

Jun. 29, 1989 [JP] Japan .................. 1-167633

[51] Int. Cl.[5] .................. H04N 5/93; H04N 5/45
[52] U.S. Cl. .................. 358/335; 358/342
[58] Field of Search ............. 358/335, 342, 341, 343, 358/180, 183; 360/19.1; 369/47, 48, 49, 50; 340/723, 724, 725

[56] References Cited

U.S. PATENT DOCUMENTS

| | | | |
|---|---|---|---|
| 4,891,705 | 1/1990 | Suzuki et al. | 340/724 |
| 4,940,970 | 6/1990 | Fujisaku | 340/724 |
| 4,989,097 | 1/1991 | Yoshio et al. | 358/335 |

*Primary Examiner*—Robert L. Richardson
*Assistant Examiner*—Huy Nguyen
*Attorney, Agent, or Firm*—Sughrue, Mion, Zinn Macpeak & Seas

[57] ABSTRACT

An apparatus for playing a recording medium on which, in addition to a video format signal and a coded information signal, graphic codes including picture information are recorded as the subcode of the coded information signal. The apparatus is structured to generate, as a reading address data, data which varies sequentially by a predetermined value from a value determined in response to a command, and to write sequentially the graphic codes output from an extracting circuit into a memory and subsequently sequentially read out the graphic codes in the order of address indicated by the reading address data. With this feature, the position of the subcode image can be moved on the picture by the video format signal. According to another feature of the invention, the apparatus is structured such that a reading timing signal which has a time relationship determined by a command with respect to a sync signal contained in the video format signal demodulated by a demodulating circuit, and the graphic codes output from the extracting circuit are written into the memory and subsequently sequentially read out in a predetermined order by using the reading timing signal.

4 Claims, 16 Drawing Sheets

| SYMBOL | R | S | T | U | V | W |
|---|---|---|---|---|---|---|
| 0 | 0 | 0 | 1 | 0 | 0 | 1 |
| 1 | 0 | 0 | 0 | 1 | 1 | 0 |
| 2 | \multicolumn{6}{PARITY Q} |
| 3 | | | | | | |
| 4 | CHANNEL | | COLOR 0 | | | |
| 5 | CHANNEL | | COLOR 1 | | | |
| 6 | 0 | ROW | | | | |
| 7 | COLUMN | | | | | |
| 8 | FONT | | | | | |
| 19 | | | | | | |
| 20 | PARITY P | | | | | |
| 23 | | | | | | |

Fig. 5

| SYMBOL | R | S | T | U | V | W |
|---|---|---|---|---|---|---|
| 0 | 0 | 0 | 1 | 0 | 0 | 1 |
| 1 | 0 | 1 | 1 | 1 | 1 | 0 |
| 2 | PARITY Q | | | | | |
| 3 | | | | | | |
| 4 | COLOR 0 | | | | | |
| 5 | | | | | | |
| 6 | | | | | | |
| 17 | | | | | | |
| 18 | COLOR 7 | | | | | |
| 19 | | | | | | |
| 20 | PARITY P | | | | | |
| 23 | | | | | | |

Fig. 7

| SYMBOL | R | S | T | U | V | W |
|---|---|---|---|---|---|---|
| 0 | 0 | 0 | 1 | 0 | 1 | 1 |
| 1 | 0 | 1 | 1 | 1 | 0 | 0 |
| 2 | PARITY Q | | | | | |
| 3 | | | | | | |
| 4 | TCB-0 | TCB-1 | TCB-2 | | | |
| 5 | TCB-3 | TCB-4 | TCB-5 | | | |
| 6 | TCB-6 | TCB-7 | TCB-8 | | | |
| 7 | TCB-9 | TCB-10 | TCB-11 | | | |
| 8 | TCB-12 | TCB-13 | TCB-14 | | | |
| 9 | TCB-15 | 0 | 0 | 0 | 0 | 0 |
| 10 | 0 | 0 | 0 | 0 | 0 | 0 |
| --- | --- | --- | --- | --- | --- | --- |
| 19 | 0 | 0 | 0 | 0 | 0 | 0 |
| 20 | PARITY P | | | | | |
| 23 | | | | | | |

Fig. 6

| MODE | ITEM |
|---|---|
| 0 0 0 0 0 0 | ZERO MODE |
| 0 0 1 0 0 0 | LINE-GRAPHICS MODE |
| 0 0 1 0 0 1 | TV-GRAPHICS MODE |
| 0 0 1 0 1 1 | GRAPHICS MODE WITH MOTION PICTURE |
| 1 1 1 0 0 0 | USER'S MODE |

Fig. 8

| TCB | MODE | SUBCODE PICTURE | MOTION PICTURE |
|---|---|---|---|
| 0 0 | TRANSPARENT MODE | 0 % | 100 % |
| 1 0 | MIXING MODE | M % | (100−M) % |
| 1 1 | NON-TRANSPARENT MODE | 100 % | 0 % |

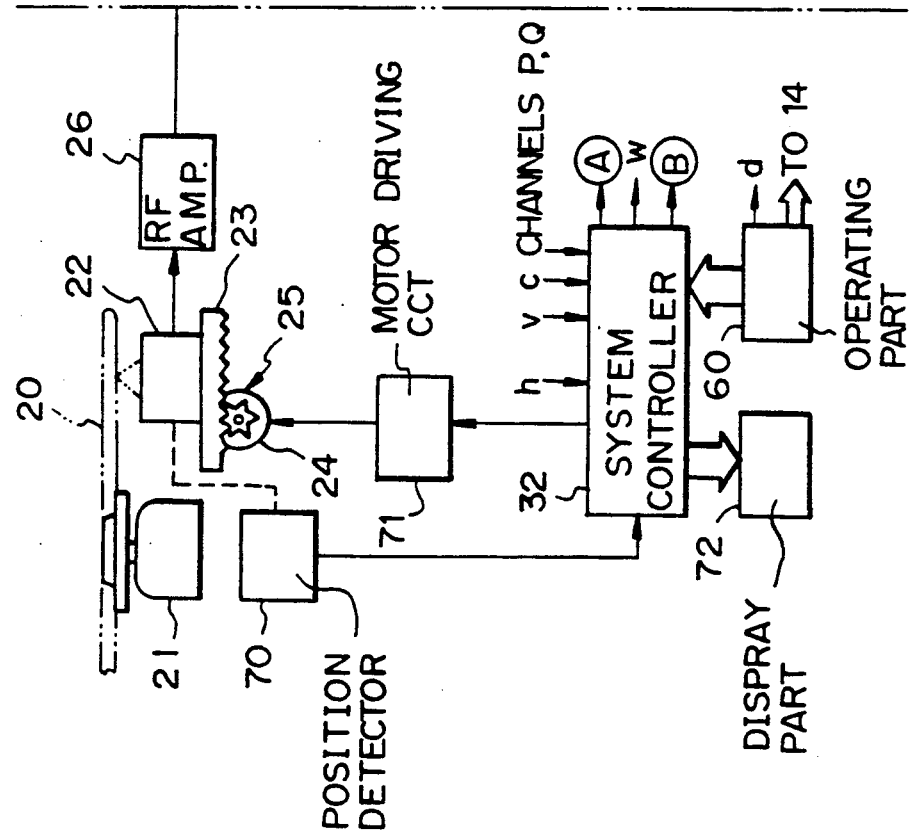

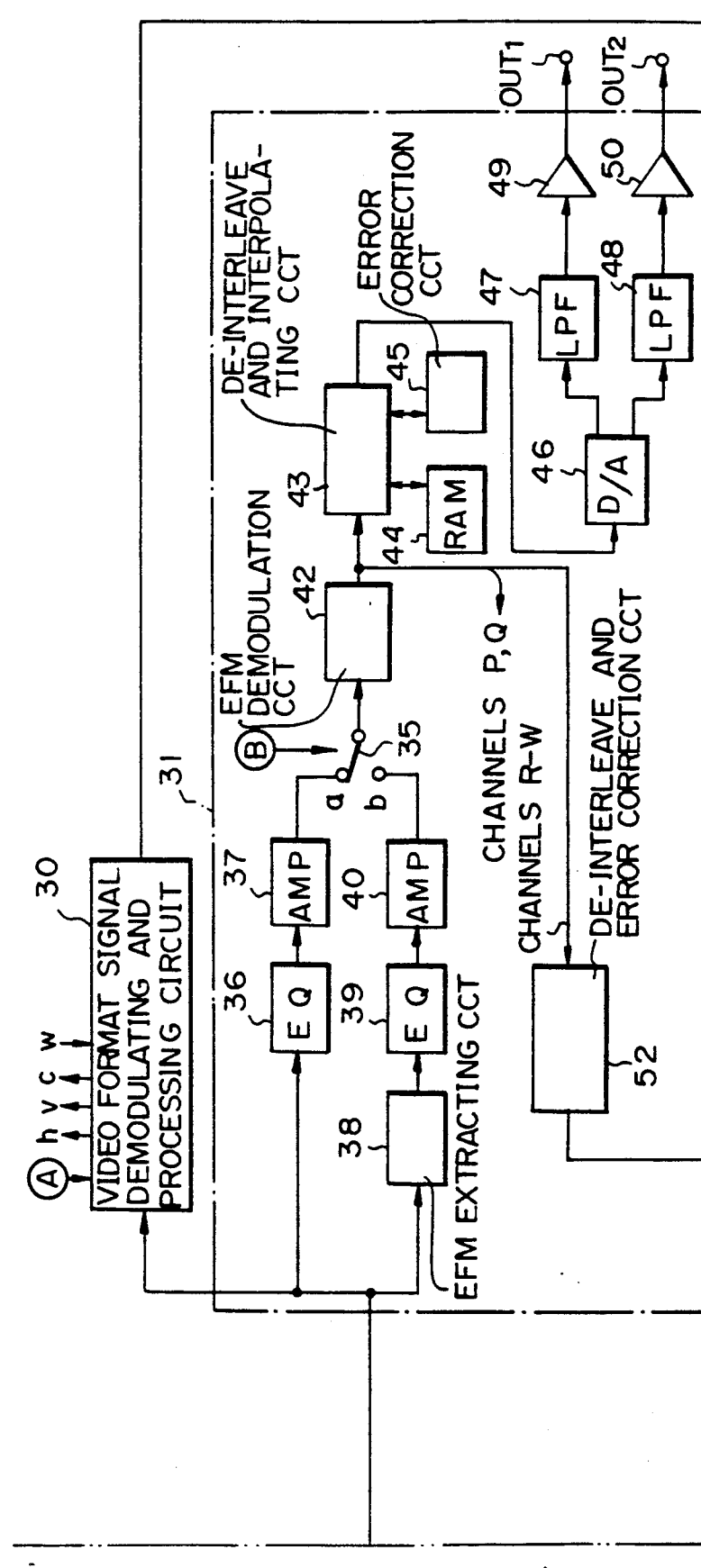

Fig. 21A
Fig. 21B
Fig. 21C
Fig. 22A  Fig. 22B
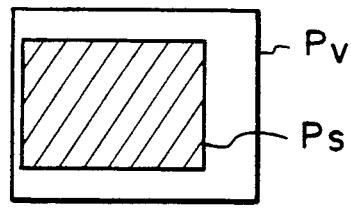 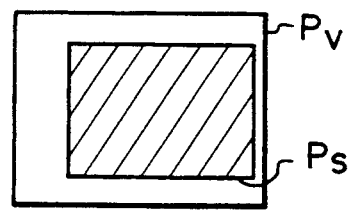
Fig. 23A
Fig. 23B
Fig. 23C
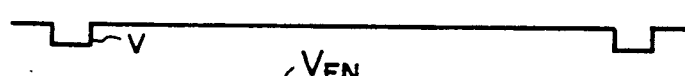
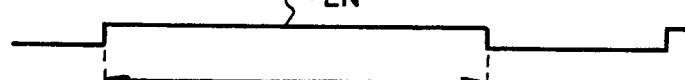
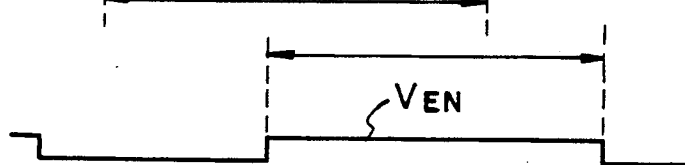
Fig. 24A  Fig. 24B
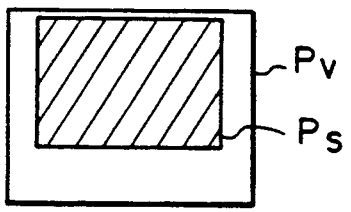 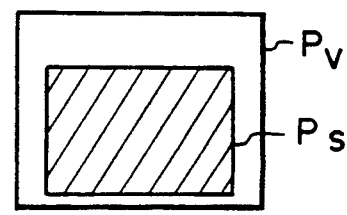

RECORDING MEDIUM PLAYING APPARATUS WHICH PERMITS CHANGES IN THE DISPLAY POSITION OF A REPRODUCED IMAGE

BACKGROUND OF THE INVENTION

1. Field of the Invention

The present invention relates to a recording medium playing apparatus for playing a recording medium such as a video disc or a digital audio disc.

2. Description of Background Information

A system has been proposed in which picture information is recorded and reproduced in the form of the subcode on and from a digital audio disc having a diameter of 12 cm, generally called compact disc (abbreviated as CD hereinafter). The subcode is made up of eight subcode bits, and bit groups forming the subcode are divided into eight channels denoted respectively by letters P, Q, R, S, T, U, V, and W. In the method in which the picture information is recorded and reproduced in the form of the subcode, data corresponding to picture information is configured such that a symbol is formed by 6 bits of channels R through W out of the 8 bits forming the subcode, and 98 symbols are treated as one block, as illustrated in FIG. 1. Two symbols in the 98 symbols are used as a sync signal, and 24 symbols obtained by dividing the remaining 96 symbols, by four are treated as a minimum unit of data, i.e. a "pack", which constitutes one instruction of picture processing.

More specifically, the first symbol (referred to as symbol 0 hereinafter) of the 24 symbols shows one of several modes. A symbol 1 following this symbol 0 forms "instruction" which indicates the sort of the instruction. Symbols 2 and 3 following the symbol 1 constitute a "parity Q" which is an error correction code. Symbols 4 through 19 following the parity Q constitute a data field, and include information such as color information. Finally, symbols 20 through 23 following the data field constitute a parity P which is an error correction code for protecting the information in the "pack".

There are four modes, i.e. "zero mode", "line-graphics mode", "TV-graphics mode", and "user's mode". The "zero mode" is provided for a case where no operation is required for pictures on the display screen, that is, the original image is to be maintained, and all data in the "pack" are 0 for this mode.

The "line-graphics mode" is provided for such a case that a liquid crystal display is provided on the front face of the player, to display notes such as an explanation of a music selection. As shown in FIG. 2, a picture area elongated sideways is formed by pixels which are arranged in 288 columns and 24 rows. In other words, each row includes 288 pixels and each column includes 24 pixels. The term "pixel" stands for the minimum display element of a picture, and it is general that the picture processing is performed by using picture composing units designated as "fonts" each of which is made up of pixels divided into 6 columns and 12 rows.

The number of "fonts" which can be displayed in the "line-graphics mode" is 48 in the lateral direction, and 2 in the column direction, and this area is designated as "screen area". For providing the scroll function, a line of "fonts" is added to the upper and lower outer peripheries and the right and left peripheries of the screen area, to form a picture area having 50 "fonts" in the direction of row, and 4 "fonts" in the direction of column. The subcode is formed so that the picture processing is performed by using a memory having addresses each corresponding to each pixel in this picture area. In addition, the area outside the "screen area" is designated as "border".

The "TV-graphics mode" is a mode for displaying images on the TV screen, and a picture is formed by pixels arranged in 192 rows and 288 columns as illustrated in FIG. 3. The number of "fonts" which can be displayed in the "TV-graphics mode" is 48 in the direction of row, and 16 in the direction of column. Also in this "TV-graphics mode", the subcode is formed so that the picture processing is performed by using a memory having addresses each of which corresponds to each pixel in a picture area having 50 "fonts" in the direction of row, and 18 "fonts" in the direction of column, made by adding a line of "fonts" to the upper and lower peripheries as well as the right and left outer peripheries of the "screen area".

Instructions for the picture processing, include an instruction for painting out the whole picture area with one certain color, an instruction for drawing a picture in one "font" on the screen by using two different colors, an instruction for moving the whole picture upward or sideways, and so on.

Additionally, in the 8-bit groups forming the subcode, the Q bits forming the channel Q include time information corresponding to the track length to a certain position of each information data which is recorded from the beginning of the program area of the CD, and from address time data which can be used as positional data representing the recording position. On the other hand, the P bits forming the channel P form data including information relating to a pause between two music selections.

In the case of the above-described system for recording and reproducing picture information as the subcode, at most nineteen picture channels can be designated. Specifically, a "write font foreground/background" instruction is used in the "TV-graphics mode", which has such a structure as illustrated in FIG. 4. This is an instruction for writing font data of the symbols 8 through 19 in positions having a row address defined by the symbol 6 and a column address defined by the symbol 7. For the pixels whose font data is "0", a color of a color number determined by the "color 0" is designated as a background color. For the pixels whose font data is "1", a color of a color number defined by "color 1" is designated as a foreground color. At the same time, sub-picture channels can be designated by using four bits of the channels R and S of the symbols 4 and 5. By this feature, as many as sixteen picture channels can be designated. Sixteen sorts of pictures are previously recorded on a disc for example, and on the playing side, a desired picture channel can be selected at the time of playback by this scheme of designating the picture channel.

In addition, the sixteen colors indicated by the color number "0" through "15" are set by a "load CLUT color 0 through color 15 (load color look-up table color 0 through color 15)" instruction. The "load CLUT color 0 through color 15" instruction is an instruction having a structure illustrated in FIG. 5, and setting the contents of a color look-up table showing the color of pre-set color numbers or foreground/background color numbers. It is necessary to designate sixteen colors in total. However, since four bits are used respectively for each of RGB to indicate a color, two symbols are required for setting one color. Therefore, eight colors are set by one "pack" at most. With these circumstances, this instruction is divided into two instructions respectively designating eight colors of the first half, and eight colors of the second half.

The instruction code for the colors of the first half, i.e. the color 0 through the color 7, is determined to be "30", and the instruction code for the colors of the second half, i.e. the color 8 through color 15 are determined to be "31". The mixing of colors for each color number is as follows. Red is represented by four bits of the channels R through U of even symbols allotted to the color number. Green is represented by four bits, i.e. two bits of the channels V and W following the channels R through U of the even symbols, and two bits of the channels R and S of odd symbols. Blue is represented by four bits of channels T through W following the channels R and S of the odd symbols. Therefore, $2^4$ (=16) sorts of gray scales are available for each color, and preparation of $16^3$ (=4096) colors is possible since three colors (RGB) are used. In addition, a gray scale "0000" corresponds to the darkest state, and a gray scale "1111" corresponds to the brightest state.

The applicants of the present application have invented a system for recording on a recording medium an FM modulated video format signal in addition to a digital audio signal to which graphic codes including picture information are inserted according to the above-described system for recording and reproducing picture information as the subcode, so that the image obtained by the subcode can be inserted into the picture obtained by the video format signal at the time of play of the recording medium. The system is disclosed in Japanese Patent Application No. P63-46603.

In order that the picture represented by the FM modulated video format signal and the picture represented by the subcode can be displayed in the same screen at the same time, the system of this prior application uses a new code as illustrated in FIG. 6 to be inserted as the symbol 0 to designate an additional mode, that is, "graphic mode with motion picture" in addition to the "zero mode" the "line-graphics mode", the "TV-graphics mode" and the "user mode" which are also used in the conventional method for recording and reproducing picture information using the subcode.

The structure of a picture in the "graphics mode with motion picture" is identical with that in the "TV-graphics mode", and an instruction designated as "load transparency control table" as illustrated in FIG. 7 is provided. This "load transparency control table" instruction is an instruction for designating the mode for each pixel in picture area. Three modes are designated by this instruction, and those are namely, "transparent mode", "mixing mode", and "non-transparent mode". In these three modes, different values are selected for the mixing ratio between a video format signal obtained by the subcode and a video format signal which is recorded by multiplexing operation together with the coded information signal including the subcode.

The bits in the channels R through W of each of the symbols 4 through 8 and the channels R and S of the symbol 9 constitute a series of codes TCB-0 through TCB 15 which respectively designate one of modes which will be described later for each of the group of pixels to which one of colors, which are registered as color number "0" through color number "15", is allotted. FIG. 8 shows the relationship between bit patterns of the codes TCB-0 through TCB-15 and the modes designating the mixing ratio, and the mixing ratio in each mode.

A recording medium playing apparatus for playing a recording medium on which information is recorded by the system of the prior application described above, is also disclosed in Japanese Patent Application No. P63-46603. This recording medium playing apparatus is constructed such that the picture signal obtained by the subcode and the video format signal recorded in the FM modulation form are mixed and output at a mixing ratio according to the graphic codes representing the color of each pixel in the display area of the image by the subcode.

However, in the system described above, the display position of the image by the subcode is set at the middle position of the display area of the image by the video format signal FM modulated for recording. Therefore, in this recording medium playing apparatus, if the display of caption (superimposed dialogue), for example, is performed by using the subcode, the caption will be displayed in the middle portion of the image by the video format signal, and such state is undesirable since the presence of the caption is annoying to the viewer.

OBJECT AND SUMMARY OF THE INVENTION

The present invention is based on the point described above, and an object of the present invention is to provide a recording medium playing apparatus which permits the display position of the image produced from the subcode to be changed.

In order to attain the above object, a recording medium playing apparatus according to the present invention is structured such that the graphic code is extracted from a coded information signal in the read signal, data varying successively by a predetermined value from a value according to a command is generated as reading address data, the graphic code is sequentially stored into a memory and in turn read-out in the order of address represented by the reading address data, and an image signal is generated according t the read-out graphic code and mixed with the video format signal.

Another recording medium playing apparatus according to the present invention is structured such that the graphic code is extracted from a coded information signal in the read signal, a reading timing signal is generated, the reading timing signal having a certain timing relationship designated by a command with respect to a sync signal in the video format signal obtained by demodulating a video format signal component of a read-out signal, the extracted graphic code is stored into a memory and in turn read-out in the order of address represented by the reading timing signal, and an image signal is generated according to the read-out graphic code and mixed with the video format signal.

BRIEF DESCRIPTION OF THE DRAWINGS

FIG. 4 is a diagram showing the construction of "write font foreground/background" instruction;

FIG. 5 is a diagram showing "load color look-up table color 0 through color 7" instruction;

FIG. 6 is a diagram showing the sort of recording modes in the method according to the present invention;

FIG. 7 is a diagram showing the construction of "load transparency control table";

FIG. 8 is a diagram showing the correspondency between the bit pattern of TCB and the mixing ratio;

FIGS. 9A through 9C, when combined, are a block diagram showing an embodiment of the playing apparatus according to the present invention;

FIG. 9 is a diagram showing the arrangement of FIGS. 9A through 9C;

FIGS. 21A through 21C are diagrams showing the operation of each part of the apparatus shown in FIG. 20;

FIGS. 22A and 22B are diagram showing the operation of the apparatus shown in FIG. 20;

FIGS. 23A through 23C are timing charts showing the operation of each part of the apparatus shown in FIG. 20; and FIGS. 24A and 24B are diagram showing the operation of the apparatus shown in FIG. 20.

DETAILED DESCRIPTION OF THE PREFERRED EMBODIMENTS

Figure 1:
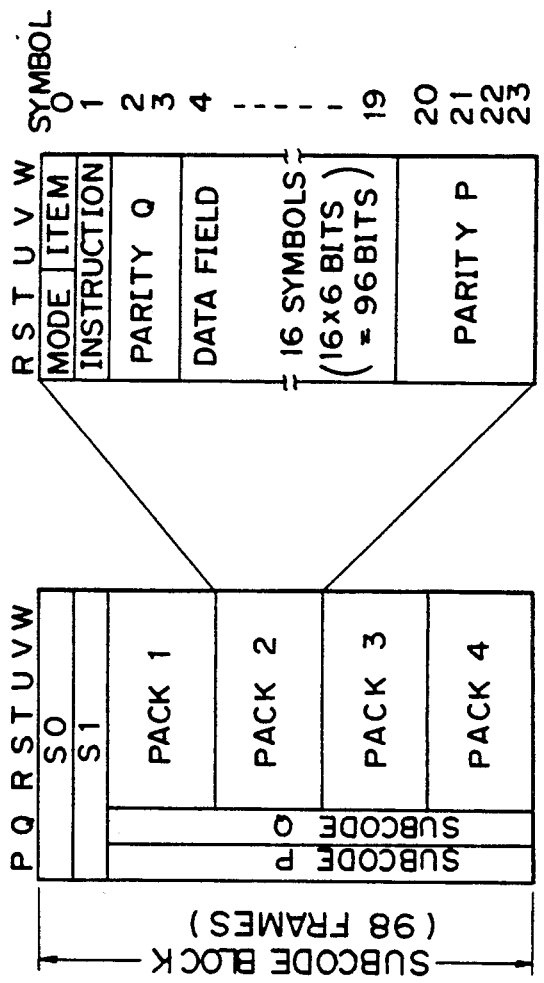
FIG. 1 is a diagram showing the recording format of subcode data.
Figure 2:
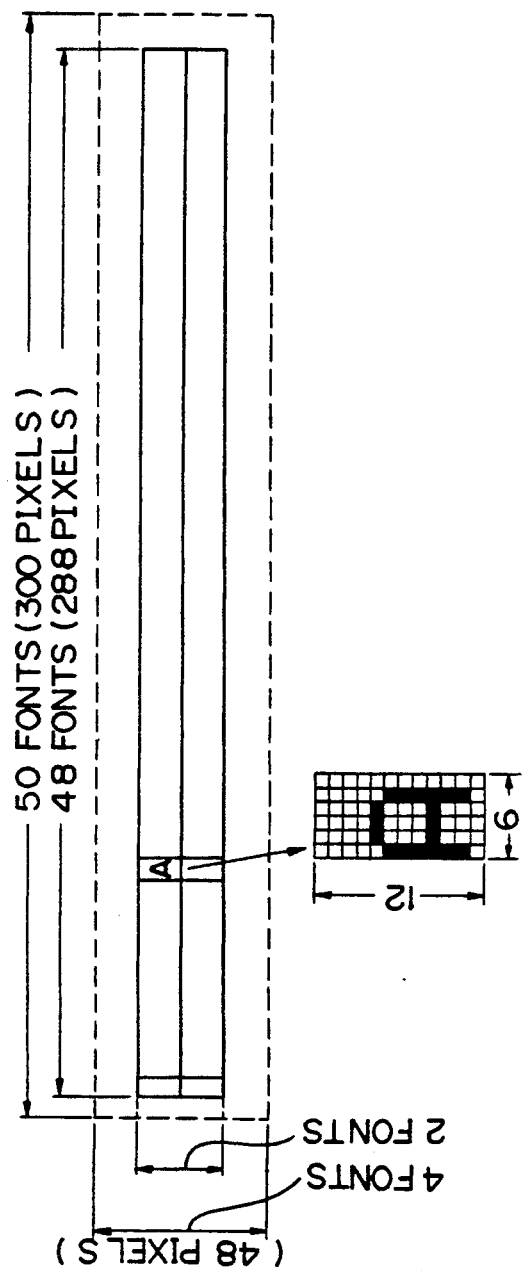
FIG. 2 is a diagram showing the structure of picture in the "line-graphics mode"
Figure 3:
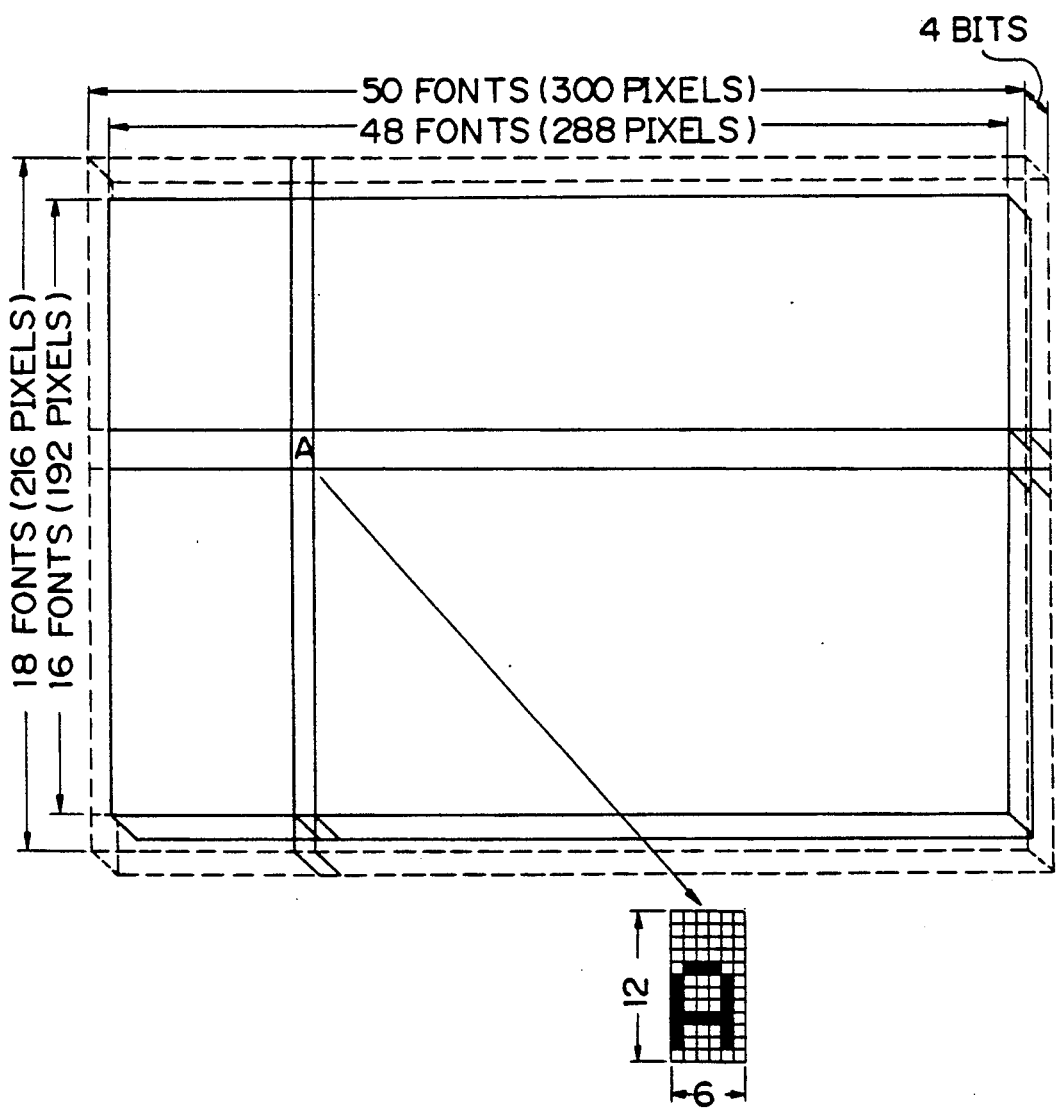
FIG. 3 is a diagram showing the structure of picture in the "TV-graphics mode"

Embodiments of the method according to the present invention will be explained with reference to FIGS. 9 through 24B of the accompanying drawings.

In FIGS. 9A through 9C and 10, the reference numeral 20 denotes a disc 20 as the recording medium. As shown, the composite disc 20 has a first area 20a disposed in an inner peripheral area of the disc (this area being referred to hereinafter as the CD area) in which is recorded a digital audio signal with the subcode including picture information for example being inserted, and a second recording area 20b (this area being referred to hereinafter a the video area) containing an FM-modulated video format signal and a superimposed digital audio signal with the subcode including picture information being inserted, wherein the superimposition is performed by using a frequency multiplexing system. Since the video format signal contains higher frequency components than the PCM signal, it is necessary to rotate the disc at a higher speed of rotation during the recording of signals in the video area 20b, than during the recording of the signal in the CD area 20a. Therefore of course it is necessary, at the time of playback, to reproduce the signal by rotating the disc at the higher speed during the playback of video area 20b, than during the playback of CD area 20a. The speed of disc rotation during the playback of CD area 20a is several hundred r.p.m., whereas during the video area playback the speed of rotation is two thousand plus several hundred r.p.m. for playback from the innermost periphery of that area, and is one thousand plus several hundred r.p.m. for playback from the outermost periphery of that area, so that the speed of rotation is extremely high during video area playback.

In the head portions of the CD area 20a and the video area 20b, there respectively are provided a lead-in area in which are recorded, as the subcode, index codes relating to the contents recorded in each area, such as first and second code groups formed correspondingly to each area by the repetition of index codes which respectively indicate start and end times of small portions which together constitute each area. In addition, the index codes of the audio lead-in area include disc type information indicating whether the disc itself is a composite disc or a disc of other type.

The disc 20 is rotated by a spindle motor 21, and information recorded thereon is read-out by means of a pickup 22. The pickup 22 incorporates therein an optical system including a laser diode, an objective lens, and photo detectors, a focus actuator for driving the objective lens in a direction of its optical axis with respect to the information recording surface of the disc 20, a tracking actuator for biasing the beam spot (information detecting point) issued from the pickup 22 with respect to the recording tracks in a direction of disc radius, and so on. The pickup 22 is mounted on a slider 23 which is movable in the direction of disc radius by a direct drive of a transmission mechanism 25 which in turn has a slider motor 24 as a source of driving force, and made by a combination of rack and pinion gears. A read-out RF (radio frequency) signal output by the pickup 22 is supplied to a video format signal demodulating and processing circuit 30 and a coded information demodulating and processing circuit 31 through an RF amplifier 26.

The video format signal demodulating and processing circuit 30 includes a demodulation circuit which for example demodulates the RF signal and converts it to a video format signal and a memory which stores the video format signal after digitizing it, and is configured to selectively output one of the video format signal output by the demodulation circuit and the video format signal read-out from the memory in accordance with a changeover command from a system controller 32. The video format signal output by the video format signal demodulating and processing circuit 30 is supplied to a video switch 33. In addition, the video format signal demodulating and processing circuit 30 is further provided with a separating circuit which separately extracts a horizontal sync signal h, a vertical sync signal v, and control data c from the demodulated video format signal, and the separated horizontal and vertical sync signals h and v, and the control data c are supplied to each part such as the system controller 32.

On the other hand, the coded information demodulating and processing circuit 31 is provided with a selector switch 35 which changes its switch position in accordance with the area to be played (the CD area or the video area) during the playing of a composite disc. The selector switch 35 is operated to a position a during the piaying of the CD area, and to a position b during the playing of the video area, and the changeover is performed in response to a changeover command issued from the system controller 32. In the case of the composite disc, the speed of disc rotation changes extremely between the CD area and the video area, and the PCM audio signal is for example an EFM (Eight to Fourteen Modulation) signal. For the video area, the EFM signal will adversely affect on the low frequency component of th video signal treated by the FM modulation process if the digital signal is directly superimposed on the FM video signal at the time of recording. Therefore, the digital signal, i.e. the EFM signal is recorded at a level which is lower than the video carrier level by several tens of dB, although the degree of modulation is almost the same for the EFM and video signals. Thus the frequency characteristic and amplitude of a playback EFM signal will both be different, for the cases of CD area playback and video area playback respectively. However, a common demodulating system is used for the CD area playback and the video area playback. This is made possible by switching signal processing systems for the playback EFM signals of the CD are and the video area respectively.

Specifically, during playback of the CD area, the playback RF signal is an EFM signal, which is subjected to frequency characteristic compensation by an equalizer circuit 36 having a predetermined equalizing characteristic, and is amplified at a predetermined amplification factor by an amplifier 37 During the playback of the video area, on the other hand, the playback RF signal is an FM video signal which is combined with an EFM signal. The EFM signal is extracted by an EFM signal extracting circuit 38 which is made up of an LPF and so on, then is subjected to frequency characteristic compensation by an equalizer circuit 39, which has a different equalization characteristic from the equalizer circuit 36, to be then amplified by an amplifier 40, which has a higher gain than that of the amplifier 37. In this way, a EFM signal is derived whose frequency characteristic and amplitude are almost the same as the EFM signal obtained during CD area playback.

During playback of a CD disc, the selector switch 35 is held in position a.

The playback EF signal selected by the selector switch 35 is supplied to an EFM demodulation circuit 42 which performs the demodulation process, to obtain a PCM data that is digital data including audio information o left and right channels which is for example time-division multiplexed, and the subcode. The digital data including audio information output by this EF demodulation circuit 42 is supplied to a de-interleave and interpolating circuit 43. The de-interleave and interpolating circuit 43 is configured to change back, in cooperation with the RAM 44, the order of the digital data which was rearranged by the interleave operation during the recording, in turn send it to an error correction circuit 45, and to effect the interpolation of erroneous data in the output data of the error correction circuit 45 by the average value interpolation method for example, when a correction inability signal is output. The error correction circuit 45 is configured to perform the error correction operation by using the CIRC (Cross Interleave Reed Solomon Code), and supply the digital data to the de-interleave and interpolating circuit 43, or supply the digital data to the de-interleave and interpolating circuit 43 together with the correction inability signal when the error correction is not possible.

The output data of the de-interleave and interpolating circuit 43 is supplied to a D/A (Digital to Analog) converting circuit 46. The D/A converting circuit 46 includes a de-multiplexer which separates from each other the digital data of left and right-channel audio information combined by the time division multiplexing, and left and right-channel audio signals are reproduced. After their unnecessary components are removed at LPFs (Low Pass Filters) 47 and 48, the reproduced left and right-channel audio signals are supplied to audio output terminals $OUT_1$ and $OUT_2$ through amplifiers 49 and 50.

On the other hand, in the subcode output by the EFM demodulating circuit 42, two bits of the channels P and Q are supplied to the system controller 32, and six bits of the channels R through W are supplied to a de-interleave and error correction circuit 52 in which the de-interleave of the six bits of the channels R through W and the error correction using the parity Q and P are performed. Output data of the de-interleave and error correction circuit 52 is supplied to a mode/instruction decoder 53. The mode/instruction decoder 53 is configured to decode the mode represented by the three bits of the channels R through T of the symbol 0 of each pack, the mode designated by the item represented by the three bits of the channels U through W of the symbol 0 of each pack, and the instruction represented by the six bits of the channels R through W of the symbol 1 of each pack, and to supply to each part signals respectively indicative of the modes and the instruction.

Furthermore, the output data of the de-interleave and error correction circuit 52 is supplied to a picture memory device 55. The picture memory device 55 includes sixteen RAMs 56a through 56p having addresses respectively corresponding to all pixels on a picture having 50 "fonts" by 18 "fonts" in the row and column directions, and four bits of data can be stored in each address, and a memory control circuit 57 for sensing data indicating the color number of each pixel of each picture channels in the output data of the de-interleave and error correction circuit 52 by using the kind of the modes and the instruction indicated by the output of the mode/instruction decoder 53 and writing them in the corresponding addresses of the RAMs 56a through 56p, and for reading out the memory content of one of the RAMs 56a through 56p corresponding to the picture channel designated by a data d by the key operation in an operating part 60, from addresses indicated by reading address data.

The reading address data supplied to the memory control circuit 57 is generated at a reading address data generating circuit 59. To the reading address data generating circuit 59, the horizontal and vertical sync signals h and v output from the video format signal demodulating circuit 30, and various commands output from the operating part in response to the key operation are supplied. From the operating part 60, one of upward movement command, downward movement command, rightward movement command, leftward movement command, and reset command is supplied to the reading address data generating circuit 59.

In the reading address data generating circuit 59, the horizontal and vertical sync signals h and v are supplied to a clock generating circuit 11 and an address counter 12. The clock generating circuit 11 is configured to sense periods other than the fly-back period by using the horizontal and vertical sync signals h and v, and to provide a clock signal having a predetermined frequency and synchronized with the horizontal sync signal h only in the sensed periods. The clock output from the clock generating circuit 11 is supplied to the address counter 12 and also to the memory control circuit 57 as a reading clock signal.

Figure 11:
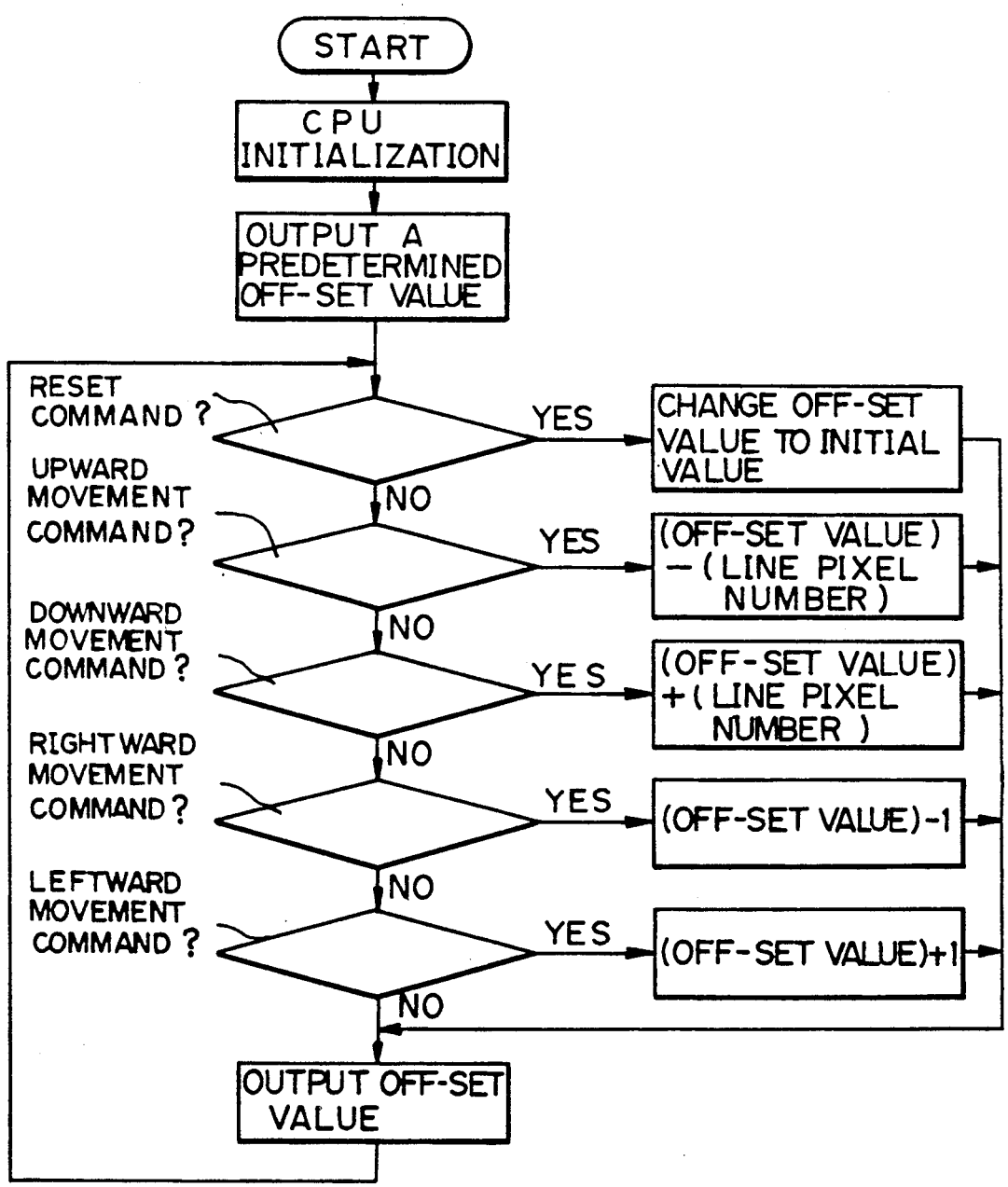
FIG. 11 is a flowchart showing the operation of the off-set data generating circuit 14 in the apparatus shown in FIGS. 9A through 9C.

The address counter 12 includes, for example, a first binary counter which counts-up the supplied clock pulses and is reset by the horizontal sync signal h, and a second binary counter which counts-up the horizontal sync signal h and is reset by the vertical sync signal v. The address counter 12 is configured such that the output data of the first binary counter is output as the LSBs (least significant bits) of the address data, and the output data of the second binary counter is output as the MSBs (most significant bits) of the address data. The address data output by the address counter 12 is supplied to an adder 13 where the address data is added to the output data of an off-set data generating circuit 14. The off-set data generating circuit 14 is configured to perform the following operations. The off-set data generating circuit 14 performs the initial setting of output data to be supplied as the off-set data when the reset command is supplied from the operating part 60. When the rightward movement command is supplied, the off-set data generating circuit 14 decreases the output data by one. On the other hand, when the leftward movement command is supplied, the off-set data generating circuit 14 increases the output data by one. When the upward movement command is supplied the off-set data generating circuit 14 decreases the output data by the number of pixels in one line. Finally when the downward movement command is supplied, the off-set data generating circuit 14 increases the output data by the number of pixels in one line. This off-set data generating circuit 14 may, for example, be constructed by using a microcomputer. FIG. 11 is a flowchart showing an example of operation performed by such a microcomputer.

The output data of the adder 13 is supplied to the memory control circuit 57 as the reading address data.

On the other hand, the data output by the picture memory device 55 is supplied to a color look-up table 58 (this table being referred to hereinafter as the CLUT). The CLUT 58 is configured to detect the "load CLUT color 0 through color 7" instruction and the "load CLUT color 8 through color 15" instruction from the output data of the de-interleave and error correction circuit 52 in accordanc with the kind of the modes and the instruction indicated by the output signal of the mode/instruction decoder 53, and hold the color data corresponding to each color number, and configured to select and output color data of the color number designated by the data read-out from the picture memory 55.

The output data of this CLUT 58 is made up of three data respectively representing the level of one of the R, G, B color signals by using four bits. The three data output by the CLUT 58 and indicating the levels of the R, G, B color signals are supplied to D/A converting circuit 61, 62, and 63, and converted to analog signals. Output signals of these D/A converting circuits 61 through 63 are supplied to an analog-to-video converting circuit 65. The analog-to-video converting circuit 65 is configured, for example, to form a video signal of the NTSC system by the steps of obtaining a luminance signal and two color difference signals by the output signals of the D/A converting circuits 61 through 63 generating a color carrier signal by adding signals obtained by the parallel modulation of two color subcarrier signal having a phase difference of 90° by means of the two color difference signals, and combining the color carrier signal and the luminance signal by the summation, and adding sync signals thereto. By this analog-to-video converting circuit 65, the output signals of the D/A converting circuits 61 through 63 are converted to a video signal and sen subsequently.

In addition, the output data of the de-interleave and error correction circuit 52 are also supplied to a transparency control table 66 (this table being referred to hereinafter as the TCT). The TCT 66 is configured to detect a "load TCT" instruction in the output data of the de-interleave and error correction circuit 52 in accordance with the kind of the modes and instructio indicated by the output signal of the mode/instruction decoder 53, hold transparency control bits TCB-0 through TCB-15, and output by selecting one of the TCB-0 through TCB-15 being held, corresponding to a color number indicated by the data read-out from the picture memory device 55.

The output signal of the TCT 66 is supplied to a video switch 33 as a control signal. In addition to the output signal of the TCT 66, the video format signal obtained from the subcode and output by the analog-to-video converting circuit 65, and the video format signal output by the video format signal demodulating and processing circuit 30 are supplied to the video switch 33.

In the video switch 33, the video format signal obtained from the subcode is supplied to a stationary contact x of the changeover switch 68, and also supplied to its stationary contact y through a resistor $R_1$. No connection is made to a stationary contact z of the changeover switch 68. The changeover switch 68 is configured to selectively output one of the signals supplied to its stationary contacts x, y, z by moving its movable contact u to be in contact with one of the stationary contacts x, y, z in accordance with a control signal issued from the TCT 66. The video format signal output from the video format signal demodulating and processing circuit 30 is directly supplied to a stationary contact z of a changeover switch 69 and also supplied to its stationary contact y through a resistor $R_2$. No connection is made to a stationary contact x of the changeover switch 69. The changeover switch 69, like the changeover switch 68, is configured to move its movable contact u to be in contact with one of its stationary contacts x, y, z in accordance with the control signal. The movable contacts u, u of the changeover switches 68 and 69 are mutually connected. A resistor $R_3$ is connected between a common junction J of the movable contacts u, u and ground. A mixed signal of the video format signal obtained from the subcode and the video format signal output from the video format signal demodulating and processing circuit 30 is derived at the common junction J. When the movable contacts u, u of the changeover switches 68 and 69 are in contact with the stationary contacts x, x respectively, the mixing ratio of the video format signal obtained from the subcode becomes 100%, and the mixing ratio is reduced to 0% when the movable contacts u, u are in contact with the stationary contacts z, z. When, on the other hand, the movable contacts z, z are in contact with the stationary contacts y, y, the mixing ratio is equal to M which is determined by the resistors $R_1$ and $R_2$, and the resistance of the resistors $R_1$ and $R_2$ are selected so that M has a value between 20% and 80%. The signal derived at the common junction J is supplied to a video output terminal $OUT_3$.

A position detector 70 is provided in the vicinity of the path of the movement of pickup 22 along the radial direction of disc, and serves to detect when the beam spot emitted from the pickup 22 has reached a position corresponding to the vicinity of the boundary between the CD area and the video area of a composite disc, to produce a detection signal. By the generation of this detection signal, a state that the pickup 22 has reached to the video area can be detected. The position detector 70 can have a known structure including for example an optical sensor. The detection signal output by the position detector 70 is supplied to the system controller 32.

The system controller 32 comprises a microcomputer which consists of a processor, a ROM (read only memory), a RAM and so on. The system controller 32 is supplied with various signals and information such as the horizontal sync signal h, the vertical sync signal v, and the control data c, the P-channel and Q-channel bits in the subcode issued from the EFM demodulation circuit 42, disc designation information from the operating part 60 indicating whether the disc to be played is a compact disc or a composite disc and mode designation information from the operating part 60, indicating whether the reproducing area is only the CD area or the video area, or both CD and video areas in the case of the playback of a composite disc.

In this system controller 32, the processor executes processing of the signals inputted in accordance with programs previously stored in the ROM, and performs the control operation of each part of the video format signal demodulating and processing circuit 30, the selector switch 35, a drive circuit (not shown) for driving the spindle motor 21, the driving circuit 71 for driving the slider motor, and the display part 72.

Figure 12:
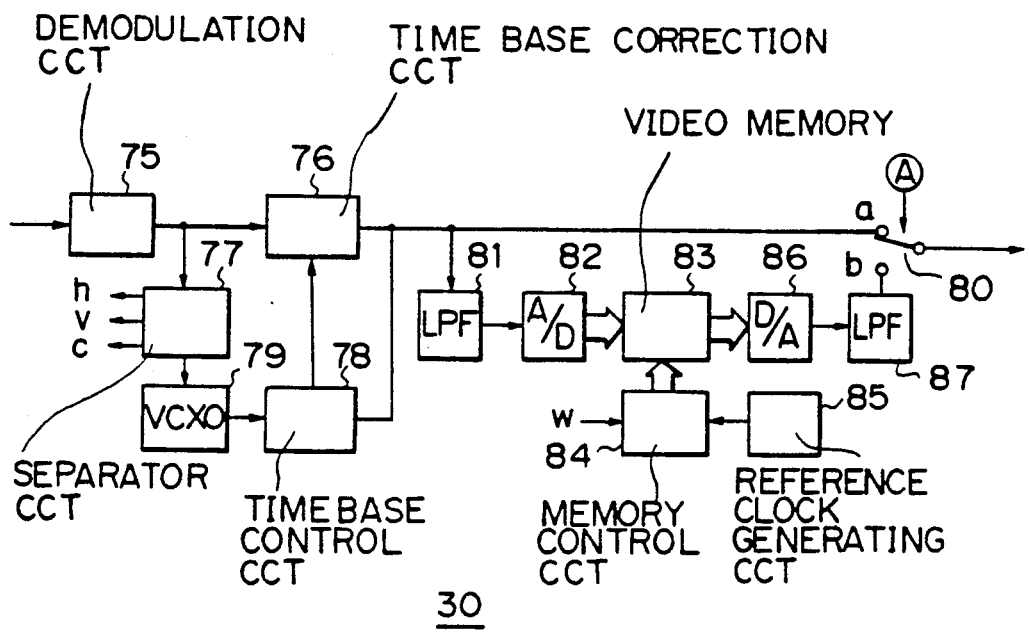
FIG. 12 is a block diagram showing a specific configuration of video format signal processing circuit 30 in the apparatus shown in FIGS. 9A through 9C.

FIG. 12 is a block diagram showing a specific circuit construction of the video format signal demodulating and processing circuit 30. As shown, the RF signal from the RF amplifier 26 is demodulated at a demodulation circuit 75, then supplied to a time base correction circuit 76 and to a separator circuit 77. In the separator circuit 77, the horizontal sync signal h, the vertical sync signal v and the control data c which are contained in the video format signal are extracted. The time base correction circuit 76 consists of, for example, a variable delay element of e.g. CCD (charge coupled device) and configured to vary the delay amount of that element in accordance with a control signal from a time base control circuit 78. The time base control circuit 78 is configured to output as the control signal a signal corresponding to a phase difference between an oscillation signal and its divided signal of a crystal oscillator (VCO) 79 which oscillates, for example, in synchronism with the horizontal sync signal h extracted at the separator circuit 77, and the horizontal sync signal and the color burst signal of the video signal transmitted through the time base correction circuit 76. For more specific configuration, reference is directed for example to Japanese patent application laid-open number P56-102182.

The video signal having been processed by the time base correction operation is used as one input of a selector switch 80, and also supplied to an A/D converter 82 through an LPF (Low Pass Filter) 81. In the A/D converter 82, the sampling of the video signal is performed at intervals of a predetermined period, and the thus obtained sampled values are in turn converted to digital data. The output data of the A/D converter 82 is supplied to a video memory 83 consisting of a RAM (random access memory) and so on. A memory having a capacity for storing video information of at least one field long is used as the video memory 83. Address and mode controls of this video memory 83 are performed by a memory control circuit 84. The memory control circuit 84 is configured to perform control operations for sequentially reading data written in each address of the video memory 83 in accordance with a clock from a reference clock generating circuit 85, and for rewriting the contents of each address of the video memory 83 in response to a write enable signal w which is output from the system controller 32. The data read-out from the video memory 83 is converted to an analog signal in a D/A (digital to analog) converter 86, and supplied through an LPF 87 as the other input to the selector switch 80. The selector switch 80 is normally held at a position a to selectively output the video format signal directly supplied from the time base correction circuit 76, and switched to a position b in response to a changeover command from the system controller 32, to selectively output the video format signal having been processed through the video memory 83.

Figure 13A:
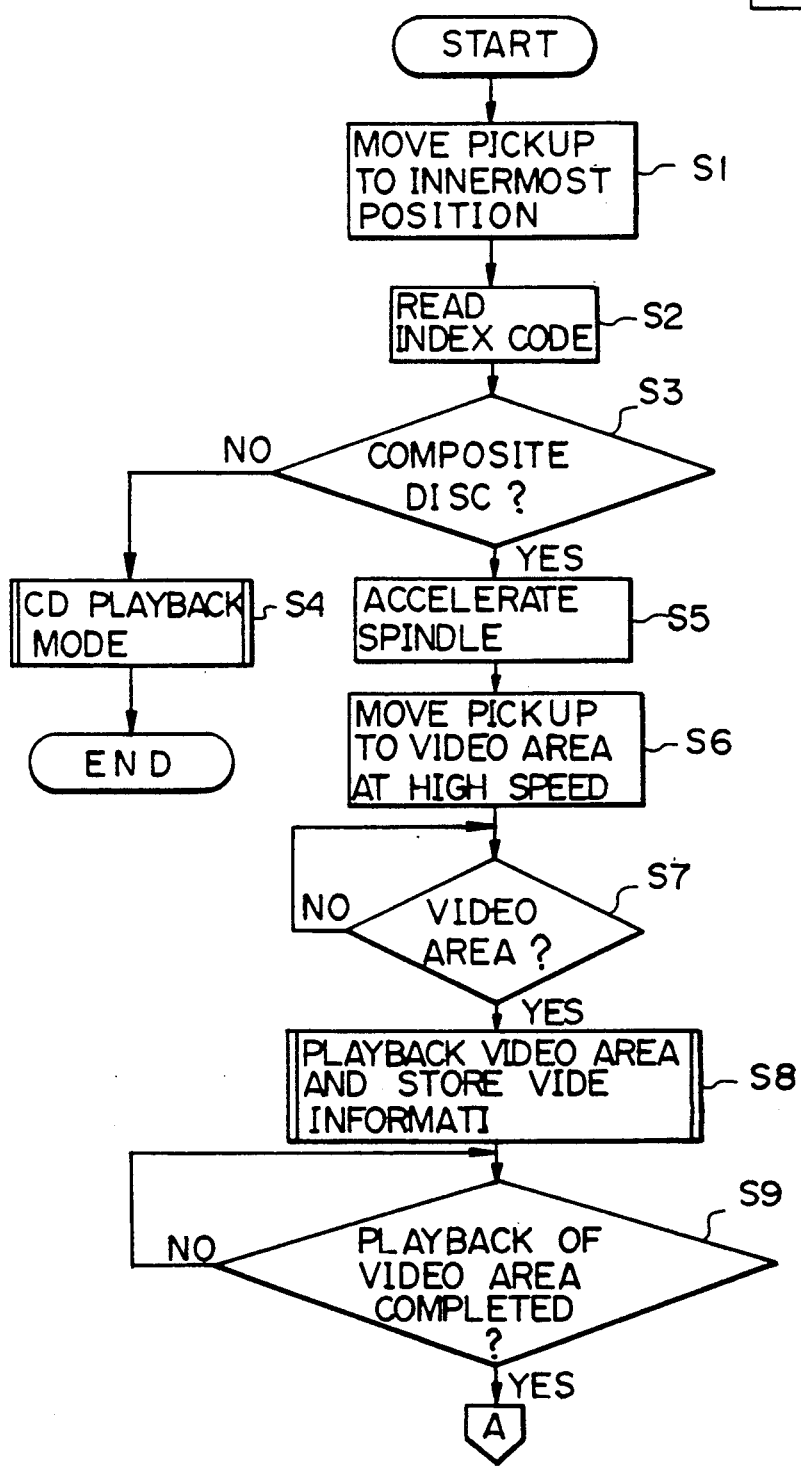
FIG. 13A and 13B are flowcharts showing the operation of the processor in the system controller of the apparatus shown in FIGS. 9A through 9C.
Figure 13B:
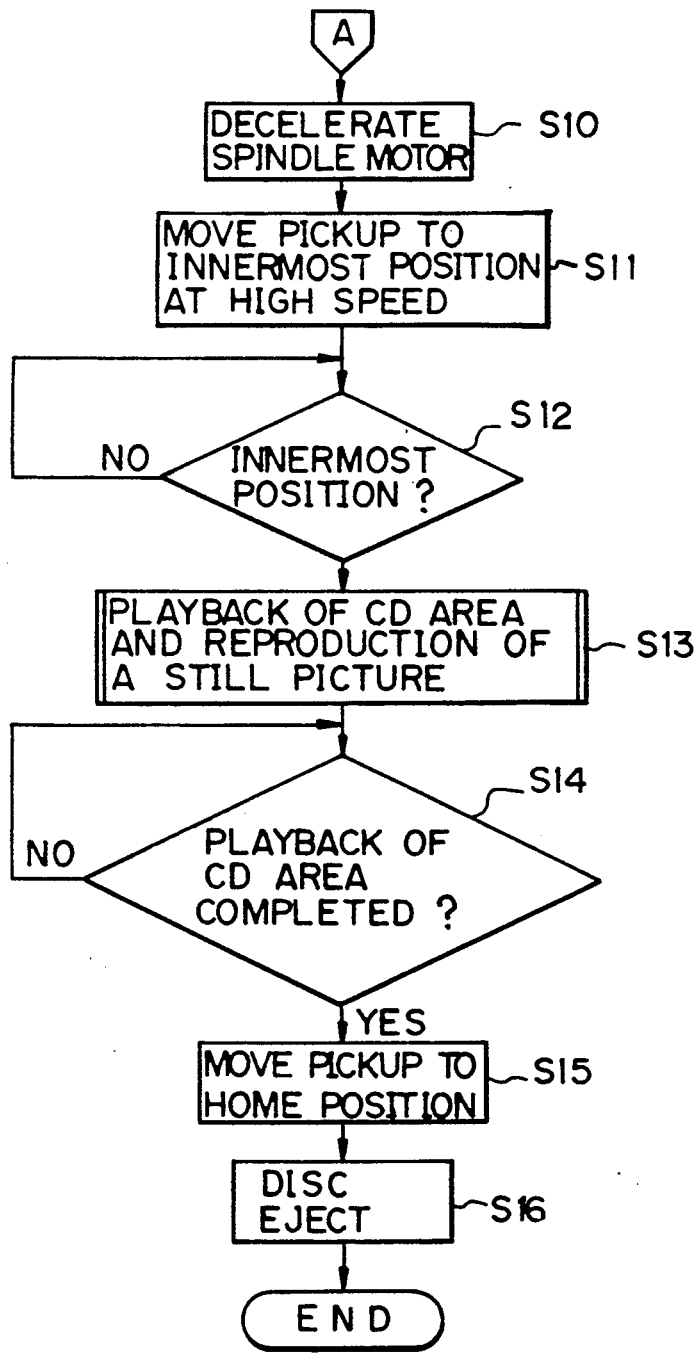

Operations of the processor in the system controller 32 in the above configuration will be specifically explained with reference to the flowchart of FIG. 13.

Assume that a composite disc is set in a playback position. When a start command is issued from the operating part 60 in this state, the processor transmits a drive command to the motor driving circuit 71, so that the slider motor 24 is driven to move the pickup 22 to an innermost peripheral position (step S1). If it is detected that the pickup 22 has reached the innermost peripheral position by means of a detector switch of any usual configuration (not shown), the processor executes a focusing operation of the pickup 22, and reads index code information which is recorded in an audio lead-in area at an innermost peripheral area of the disc (step S2). Subsequently, the processor judges whether or not the disc being set is the composite disc or not, on the basis of the read information (step S3). If it is judged that the disc being set is not a composite disc, then the execution directly proceeds to a CD playback mode (step S4) and a playback operation is continuously performed unless any command for the programmed music selecting operation for example has been issued. Since the playback operation in the CD playback mode itself is well known, the explanation thereof is omitted here.

If it is judged in step S3 that the disc being set is a composite disc, the processor immediately accelerates the slider motor 21 to a maximum rated speed of rotation for the video area (step S5). At the same time, the processor moves the pickup 22 toward the outer periphery of disc at high speed by driving the slider motor 24 at high speed (step S6). After these operations, when it is detected that the pickup 22 has reached the video area by the detection signal from the position detector 70 (step S7), the processor starts the playback operation of the video area (step S8).

During the video area playback, the processor performs the control operation for writing the video information of at least one field (or one frame) obtained from the disc into the video memory 83. This video information to be written may be, for example, the first information in the video area, or designated by an address designation through the key operation of the operating part 60.

If it is detected that the playback of the video area has been completed, in step S9, then the processor decelerates the spindle motor 21 to the maximum rated speed of rotation for the CD area (step S10). At the same time, the processor drives the slider motor 24 at high speed, to move the pickup 22 to the innermost peripheral position of the disc at high speed (step S11). If it is detected (step S12) that the pickup 22 has reached the innermost peripheral position by the detection output signal of the above mentioned detector switch (not illustrated), the processor starts the playback operation of the CD area (step S13). At the same time, the selector switch 80 in the video format signal demodulating and processing circuit 30 is changed over by the processor to the position b thereby selecting and outputting the video information which was written in the video memory 83 during video area playback. Thus, playback of a still picture is performed during CD area playback. When the completion of the CD area playback is detected by reading the information of audio lead-out (step S14), the processor initiate the driving of the slider motor 24 to move the pickup 22 to its home position (step S15) unless any operational command is present. Furthermore, the disc is ejected by a loading mechanism (not shown in the drawings), to complete the playback operating sequence.

In the operating sequence described above, playback of the information recorded in the CD area of the composite disc is performed in steps S10 through S14 after the playback of information recorded in the video area through steps S1 to S9.

When the "load CLUT color 0 through color 7" instructions and the "load CLUT color 8 through color 15" instructions are decoded by the mode/instruction decoder 53 during video area playback, data of designated 16 colors among 4096 colors are held in the CLUT 58.

Subsequently, by the decoding of the "write font foreground/background" instruction etc., image data of 16 channels are in turn stored in the RAM 56a through 56p in the picture memory device 55. When one of the image data of 16 channels is designated by data corresponding to the key operation in the operating part 60, image data of the designated channel is sequentially output from the picture memory device 55, and in turn supplied to the CLUT 58. By this operation, color data of a color number indicated by the image data is then output from the CLUT 58. A video format signal based on this color data is output from the analog-to-video converting circuit 65, and supplied to the video switch 33.

Figure 14:
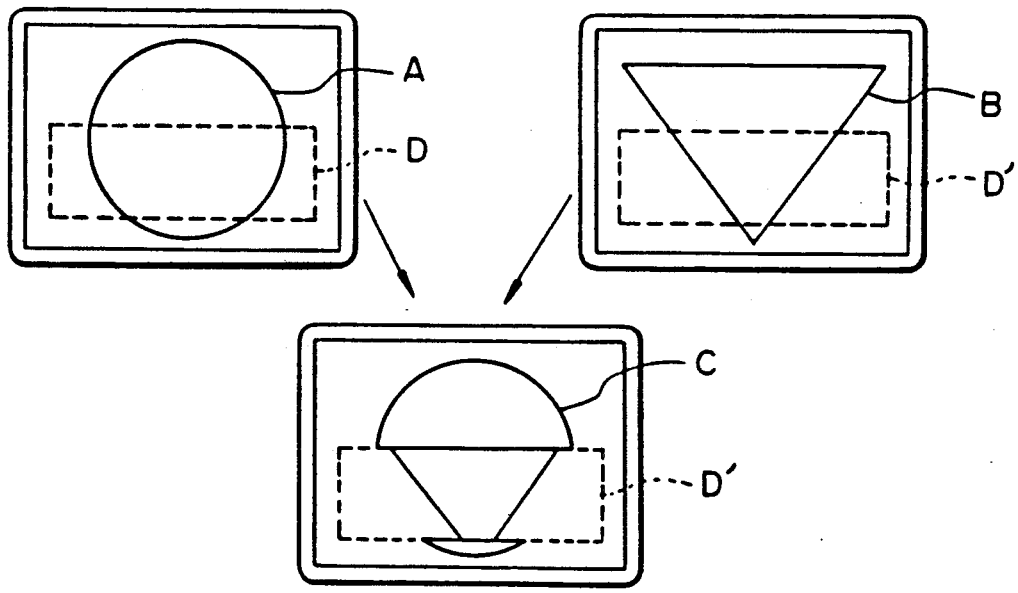
FIG. 14 is a diagram showing pictures obtained by the apparatus shown in FIGS. 9A through 9C.

If the "load TCT" instruction is decoded in this state, the transparency control bits TCB-0 through TCB-15 respectively corresponding to each color number are then held in the TCT 66. Among the TCB-0 through TCB-15 being held, one corresponding to the color number indicated by the data read-out from the picture memory device 55 is selectively output from the TCT 66, and the mixing ratio in the video switch 33 is designated by the output of the TCT 66. Thus, the mixing ratio between the video format signal output from the analog-to-video converting circuit 65 and the video format signal output from the video format signal demodulating and processing circuit 30 is controlled for each pixel. Consequently, a combination of pictures such as illustrated in FIG. 14 is made possible. Specifically, the mixing ratio is set to 100% for a portion corresponding to each pixel outside a region D of a picture A based on the video format signal output from the video format signal demodulating and processing circuit 30, and set to 0% for a portion corresponding to each pixel within the region D. On the other hand, the mixing ratio is set to 0% for a portion corresponding to each pixel outside a region D' of a picture B based on the video format signal output from the analog-to-video converting circuit 65, and set to 100% for a portion corresponding to each pixel within the region D' of the picture B. Then a picture C can be formed by combining the portion of the picture A outside the region D and and the portion of the picture B within the region D'.

In this way, it is possible to compose a picture in which a caption, a musical score, or an explanation of a scene, etc., obtained from the subcode is inserted into a moving pictur obtained by the video format signal recorded in the video area or a still picture obtained by the video memory 83.

Figure 15:
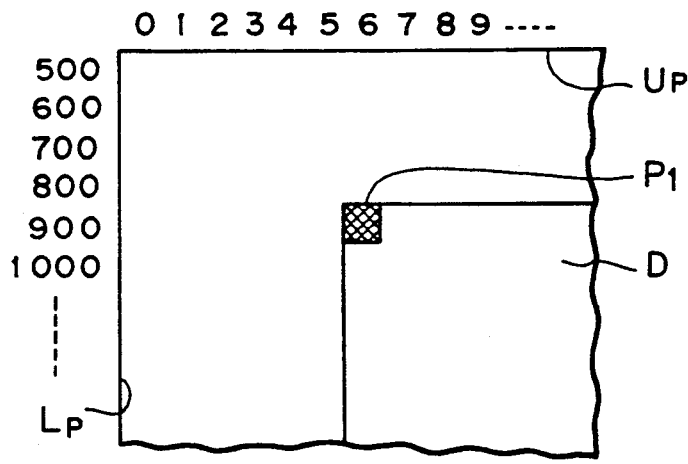
FIGS. 15 and 16 are diagrams showing the operation of the apparatus shown in FIGS. 9A through 9C.

Now, assume that the number of pixels in the horizontal direction is 100, and data corresponding to portions in the region D' of the picture B is stored in one of the RAMs 56a through 56p corresponding to the designated channel, in addresses after the address "906". In this state, if the output data of the off-set data generating circuit 14 is "500", then image data written in addresses after the address "500" of the RAM corresponding to the designated channel is sequentially read-out. In this case the position of the region D' is set such that the pixel $P_1$ at the upper left corner of the region D' is located at a position away from, in the horizontal direction, the left periphery $L_P$ of the display area for the image by the subcode, by a distance corresponding to six pixels rightward, and away from, in the vertical direction, the upper periphery $U_P$ of the display area, by a distance corresponding to four pixels downward, as illustrated in FIG. 15.

Figure 16:
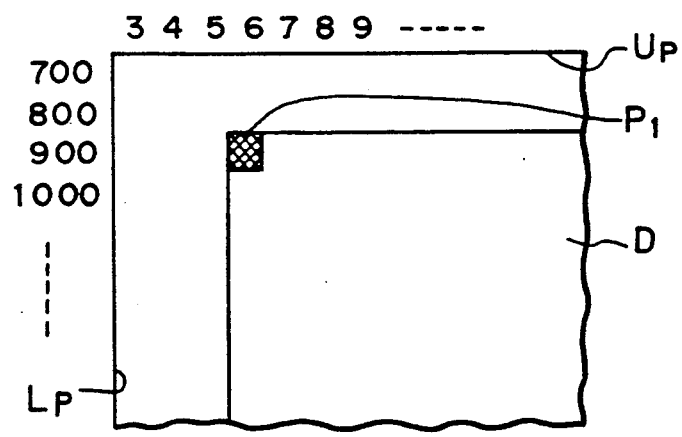

On the other hand, if the output data of the off-set data generating circuit 14 is "703" for example, the image data stored in addresses after the address "703" of the RAM corresponding to the designated channel is sequentially read-out. In this case the position of the region D' is set such that the pixel $P_1$ at the upper left corner of the region D' is located at a position away from, in the horizontal direction, the left periphery $L_P$ of the display area for the subcode image, by a distance corresponding to three pixels rightward, and away from, in the vertical direction, the upper periphery $U_P$ of the display area, by a distance corresponding to two pixels downward, as illustrated in FIG. 16.

As described above, the position of the region D' is varied in accordance with the value of the output data of the off-set data generating circuit 14. Therefore, the display position of the subcode image can be arbitrary determined by the key operation in the operating part 60.

Figure 17:
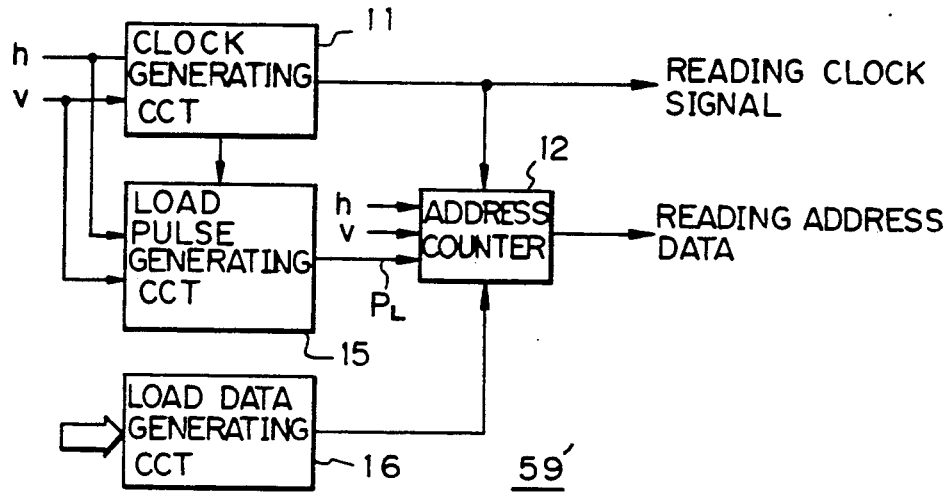
FIG. 17 is a diagram showing another embodiment of the present invention.

FIG. 17 shows another embodiment of the present invention in which only the reading address data generating circuit 59' is illustrated. The circuit blocks other than the reading address data generating circuit 59' are omitted since their constructions are the same as those of the corresponding blocks shown in FIGS. 9A through 9C. In FIG. 17, the horizontal and vertical sync signals h and v output from the video format signal demodulating and processing circuit 30 are supplied to the clock generating circuit 11 and to a load pulse generating circuit 15. The clock generating circuit 11 is configured to supply the clock signal of the predetermined frequency synchronized with the horizontal syn signal h to the load pulse generating circuit 15. As in the case of the circuit shown in FIGS. 9A through 9C, the clock generating circuit 11 configured to provide this clock signal of the predetermined frequency to the address counte 12 and also to the memory control circuit 57 as a reading clock signal, only during the periods other than the fly-back period. The load pulse generating circuit 15 is configured to sense a portion corresponding to the pixel to be displayed at first on the image by the video format signal issued from the video format signal demodulating and processing circuit 30, i.e. the pixel located at the upper left corner of the screen, by using the horizontal and vertical sync signals h and v, and the clock signal from the clock generating circuit 11, and to generate a load pulse signal $P_L$. The load pulse signal $L_P$ is supplied to the address counter 12. To the address counter 12, a load data from a load data generating circuit 16 is also supplied. The address counter 12 is configured to hold the load data as the initial value of the count value data upon receipt of a load pulse $P_L$. As in the case of the apparatus shown in FIGS. 9A through 9C. the address counter 12 varies the count value data in accordance with the horizontal and vertical sync signals h and v, and also the reading clock signal. The output data of the address counter 12 is supplied to the memory control circuit 57 as the reading address data.

Figure 9C:
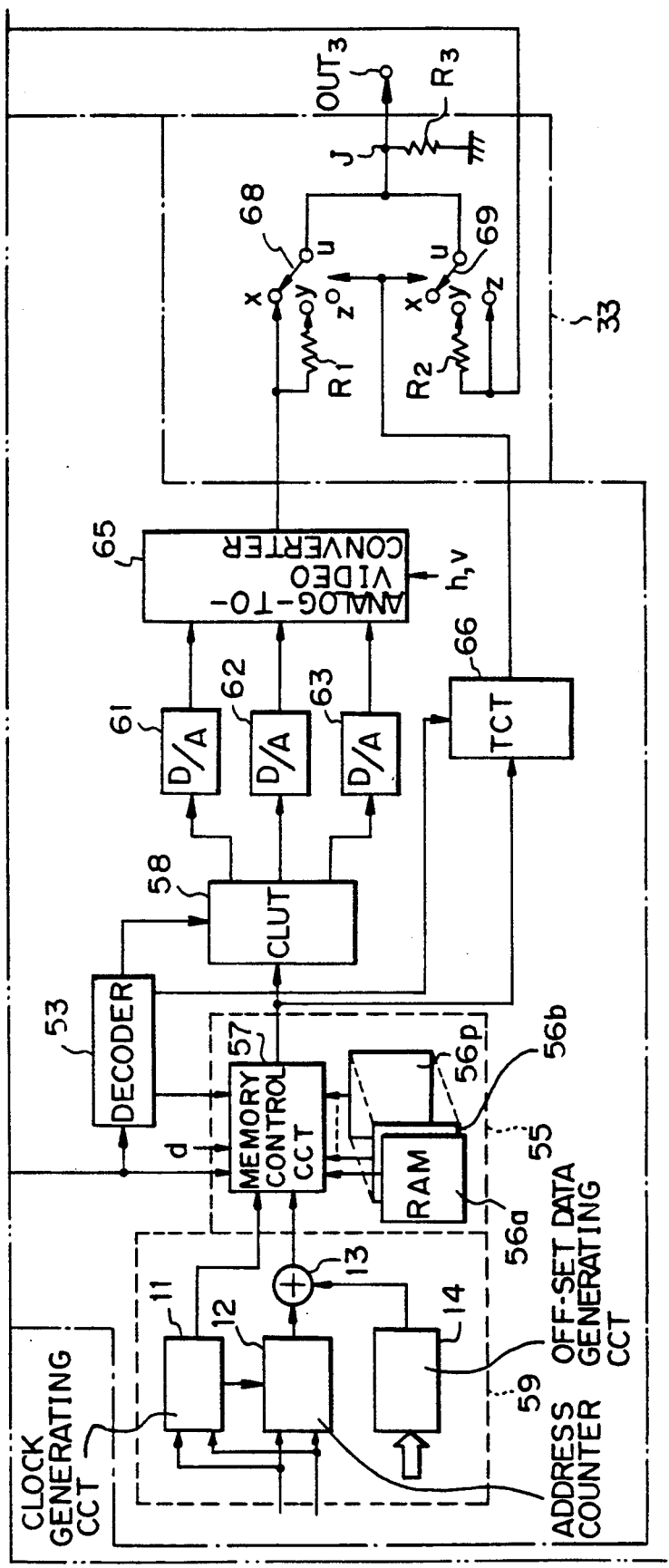
Figure 10:
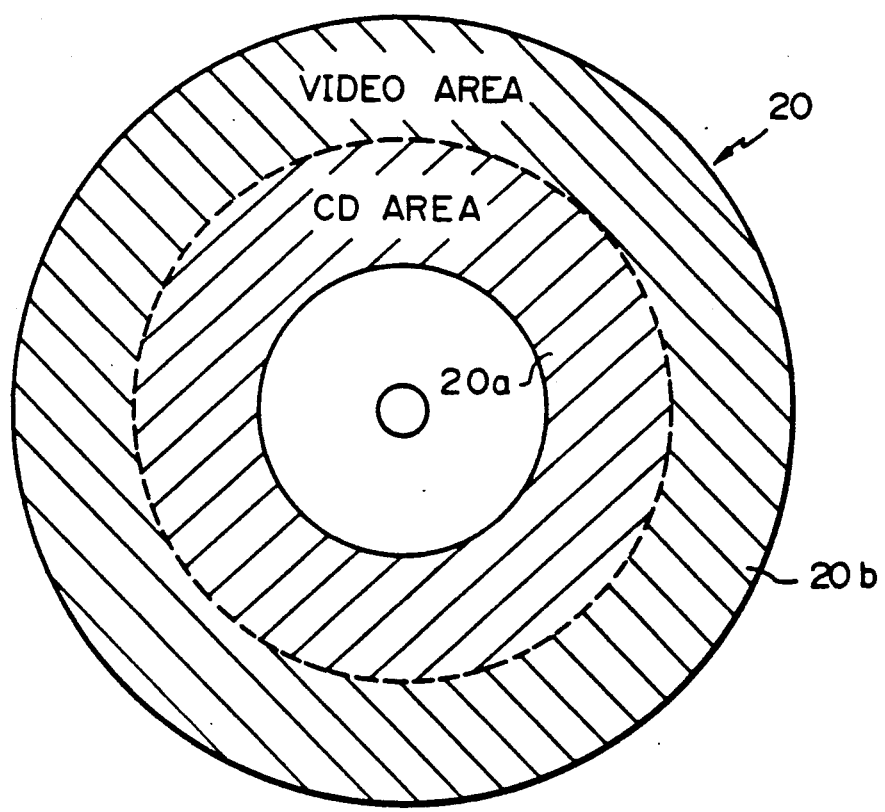
FIG. 10 is a diagram showing recording area of a composite disc.

The load data generating circuit 16 is configured, as the off-set data generating circuit 14 in the apparatus shown in FIGS. 9A through 9C, to perform initial setting of the output data to be supplied as the load data when the reset command is supplied from the operating part 60, to decrease the output data by one when the rightward movement command is supplied, to increase the output data by one when the leftward movement command is supplied, to decrease the output value by the number of pixels in one line when the upward movement command is supplied, and to increase the output value by the number of pixels in one line when the downward movement command is supplied.

Figure 18A:
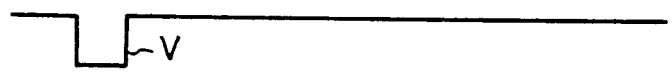
FIGS. 18A through 18C, and 19A through 19C are timing charts showing the operation of each part of the apparatus shown in FIG. 17.
Figure 18B:
Figure 18C:
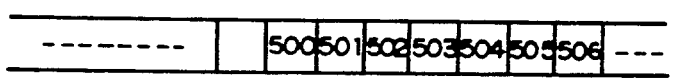

With the construction described above, if the value of the load data is "500", the load pulse $P_L$ is output in synchronism with the portion corresponding to the pixel to be displayed firstly on the image by the video format signal after the output (FIG. 18A) of the vertical sync signal v, as shown in FIG. 18B. As a result, the load data is held in the address counter 12 as the initial value of the count value data by means of the load pulse $P_L$, and the reading address data will be varied as shown in FIG. 18C. Thus, the image data written in addresses after the address "500" of the RAM corresponding to the designated channel is sequentially read out.

Figure 19A:
Figure 19B:
Figure 19C:
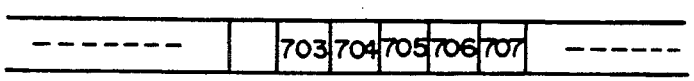

If the value of the load data is "703" for example, the reading address data will be varied as shown in FIG. 19C, so that the image data written in addresses after the address "703" of the RAM among the RAMs 56a through 56p corresponding to the designated channel is sequentially read-out.

Therefore, assuming that the number of pixels in the horizontal direction is 100, and the data corresponding to the portion inside the region D' of the image B by the subcode is written in addresses after the address "906" of one of the RAMs 56a through 56p corresponding to the designated channel, the position of the region D, is set as shown in FIG. 15 if the value of the load data is "500", and set as shown in FIG. 16 if the value of the load data is "703", as in the case of the apparatus shown in FIGS. 9A through 9C.

Thus, as in the apparatus shown in FIGS. 9A through 9C, the display position of the subcode image can be set arbitrary b changing the value of the load data by the key operation in the operating part 60.

Figure 20:
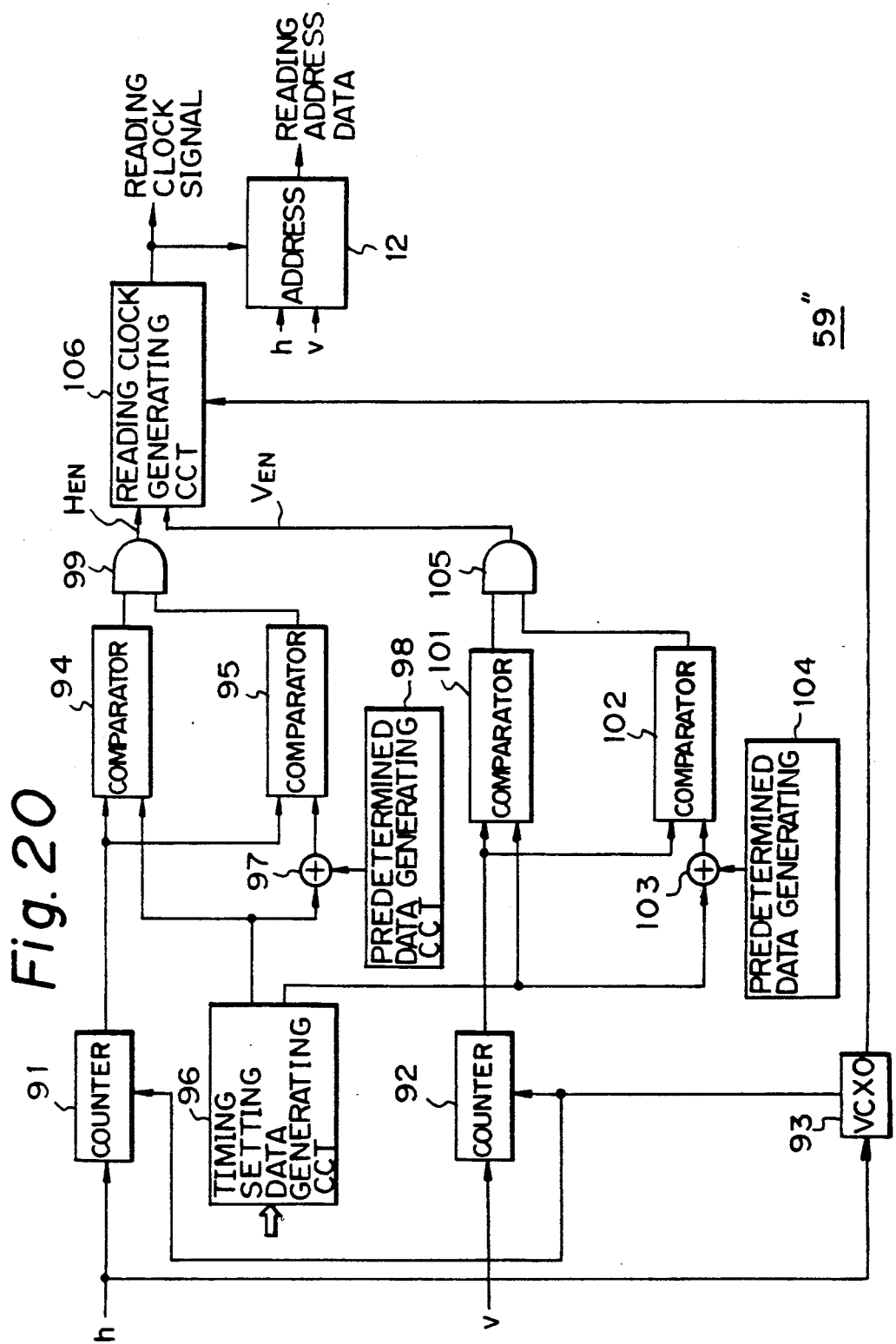
FIG. 20 is diagram showing a further embodiment of the present invention.

FIG. 20 shows a further embodiment of the present invention in which only the reading address data generating circuit 59" is illustrated. The circuit blocks other than th reading address data generating circuit 59" are omitted since their constructions are the same a those of the corresponding blocks shown in FIGS. 9A through 9C. In FIG. 20, the horizontal and vertical sync signals h and v output from the video format signal demodulating and processing circuit 30 are supplied to reset terminals of counters 91 and 92 respectively. The horizontal sync signal h is further supplied to a VCXO 93 from which a clock signal of a predetermined frequency synchronized with the horizontal sync signal h is output. This clock signal is supplied to respective clock input terminal of the counters 91 and 92.

The output data of the counter 91 is supplied to a comparator circuits 94 and 95. To the comparator circuit 94, a first timing setting data from a timing setting data generating circuit 96 is also supplied. The timing setting data generating circuit 96 is configured to generate the first timing setting data whose initial value is set in response to the reset command from the operating part 60, to be increased by a predetermined value in response to the rightward movement command, and decreased by the predetermined value in response to the leftward movement command, and also a second timing setting data whose initial value is set in response to the reset command, to be increased by a predetermined value in response to the upward movement command, and decreased by the predetermined value in response to the downward movement command.

To the comparator circuit 95, the output data of an adder 97 is also supplied. The first timing setting data from the timing setting data generating circuit 96 and output data of a predetermined data generating circuit 98 are supplied to the adder 97. The predetermined data generating circuit 98 is configured to generate data corresponding to a period slightly shorter than a period obtained by subtracting the fly-back period from one horizontal scanning period.

The comparator circuit 94 is configured to generate a high level signal when the output data of the counter 91 is greater than the first timing setting data. On the other hand, the counter 95 is configured to generate the high level signal when the output data of the counter 91 is smaller than the output data of the adder 97. The outputs of these comparators 94 and 95 are supplied to an AND (logical product) gate 99. Accordingly, the output of the AND gate 99 stays at the high level, in each horizontal scanning period, for the period slightly shorter than the period obtained by subtracting the fly-back period from one horizontal scanning period, after the instant at which the first timing setting data is exceeded by the output data of the counter 91.

The output data of the counter 92 is supplied to comparators 101 and 102. The second timing setting date output from the timing setting data generating circuit 96 is supplied to the comparator 101. On the other hand, output data of an adder 103 is supplied to the comparator 102. To the adder 103, the second timing setting data from the timing setting data generating circuit 96 and output data from a predetermined data generating circuit 104 are supplied. The predetermined data generating circuit 104 is configured to generate a data corresponding to a period slightly shorter than a period obtained by subtracting the vertical fly-back period from one vertical scanning period.

The comparator circuit 101 is configured to output the high level signal when the output data of the counter 92 is greater than the second timing setting data. On the other hand, the comparator circuit 102 is configured to output the high level signal when the output date of the counter 92 is smaller than the output data of the adder 103. The outputs of these comparator circuits 101 and 102 are supplied to an AND gate 105. Therefore, the output of the AND gate 105 stays at the high level, in each vertical scanning period, for the time period slightly shorter than the time period obtained by subtracting the vertical fly-back period from one vertical scanning period, after the instant at which the second timing setting data is exceeded by the output data of the counter 92.

These high level signals output from the AND gates 99 and 105 are supplied to a reading clock generating circuit 106, respectively as reading enable signals $H_{EN}$ and $V_{EN}$. A clock signal from the VCXO 93 is also supplied to the reading clock generating circuit 106. The reading clock generating circuit 106 is configured to generate a reading clock signal of a predetermined frequency synchronized with the clock signal output from the VCXO 93, only when the reading enable signals HEN and VEN are present. The reading clock signal output from the reading clock signal generating circuit 106 is supplied to the address counter 12 and the memory control circuit 57. The address counter 12 is configured in the similar manner as the address counter 12 shown in FIGS. 9A through 9C, and the output data of the address counter 12 is supplied to the memory control circuit 57 as the reading address data.

With the structure described above, the period in which the reading example signal $H_{EN}$ is present is as shown in FIG. 21B with respect to the horizontal sync signal h which is shown in FIG. 21A, when the value of the first timing setting data output from the timing setting data generating circuit 96 is small. The set position of the display picture $P_S$ of the subcode image, in this state, is shifted leftward from the center of the display picture $P_V$ of the image by the video format signal having been recorded in frequency modulation form, as shown in FIG. 22A. If the first timing setting data output from the timing setting data generating circuit 96 becomes large, the period in which the reading enable signal $H_{EN}$ is present becomes as shown in FIG. 21C, and the set position of the display picture $E_S$ of the subcode image is shifted rightward from the center of the display picture $P_V$, as shown in FIG. 22B.

Furthermore, the period in which the reading enable signal $V_{EN}$ is present is as shown in FIG. 23B with respect to the vertical sync signal v which is shown in FIG. 23A, when the value of the second timing setting data output from the timing setting data generating circuit 96 is small. The set position of the display picture $E_S$ of the subcode image, in this state, is shifted upward from the center of the display picture $P_V$, as shown in FIG. 24A. If the second timing setting data output from the timing setting data generating circuit 96 becomes large, the period in which the reading enable signal $V_{EN}$ is present becomes as shown in FIG. 23C, and the set position of the display picture $E_S$ of the subcode image is shifted downward from the center of the display picture $P_V$, as shown in FIG. 24B.

Accordingly, by varying the values of the first and second timing setting data by mean of the key operation in the operating part 60, the position of the display picture $E_S$ of the subcode image can be arbitrary set at a desired position on the display picture $P_V$ of the image by the video format signal which has been recorded in frequency modulation form. In this way, the display position of the subcode image is varied.

In the embodiments described above, the composite disc generally called "CDV" has been explained as an example of the recording medium on which the subcode carrying picture information is recorded. However, it is needless to say that the present invention is applicable to cases using, as the recording medium for recording the subcode carrying picture information, other recording medium such as the disc called LDD, i.e. a disc on which the FM modulated video format signal, the audio signal and the digital audio signal are recorded by using a frequency multiplexing operation.

As specifically explained in the foregoing, the recording medium playing apparatus according to the present invention is configured such that the graphic code recorded as the subcode is extracted from the coded information signal contained in the reading signal, and a data, which sequentially varies by a predetermined value from a value determined in response to a command, is generated as the reading address data, the extracted graphic code is sequentially written into a memory and subsequently read-out in the order of the address indicated by the reading address data, and a picture signal corresponding to the read-out graphic code is generated and mixed with the video format signal.

Therefore, in the recording medium playing apparatus according to the above-mentioned feature of the present invention, the position of the display picture of the subcode image set on the display picture of the image by the video format signal does not change itself. However, since the reading of the memory starts from an address determined in response to the command, the start time of the reading of the graphic code written in the memory is varied according to the command. Therefore, the relative position of the display position of the subcode image with respect to the image by the video format signal can be changed.

Furthermore, the other recording medium playing apparatus according to the present invention is configured such that the graphic code recorded as the subcode is extracted from the coded information signal contained in the read-out signal, a reading timing signal having a time relationship determined in response to a command, with respect to the sync signal contained in the video format signal, is generated, the extracted graphic code is sequentially written into a memory and subsequently read-out in a predetermined order according to the reading timing signal, and a picture signal corresponding to the read-out graphic code is generated and mixed with the video format signal.

Therefore, in the recording medium playing apparatus according to the other feature of the present invention, the position of the display picture of the subcode image set on the display picture of the image by the video format signal changes itself in response to the command. Therefore the relative position of the display position of the subcode image with respect to the image by the video format signal can be changed also in this case.

What is claimed is:

1. An apparatus for playing a recording medium on which, in addition to a video format signal and a coded information signal, graphic codes including picture information are recorded as the subcode of said coded information signal, said apparatus comprising:

reading means for recovering signals recorded on said recording medium;

demodulating means for demodulating a video format signal component contained in a read-out signal obtained by said reading means, said demodulating means generating horizontal and vertical sync signals;

extracting means for extracting said graphic codes from said coded information signal contained in said read-out signal;

reading address data generating means for generating address data, which varies sequentially by a predetermined value in response to said horizontal and vertical sync signals and commands from an operating part;

a memory;

memory control means for sequentially writing said graphic codes output from said extracting means into said memory and sequentially reading out said graphic codes in the order of address indicated by said reading address data;

picture signal deriving means for deriving a picture signal corresponding to said graphic codes output by means of said memory control means, so as to produce said picture information recorded as said subcode in any desired portion of a display; and mixing means for mixing said picture signal with said video format signal output from said demodulating means.

2. An apparatus for playing a recording medium on which, in addition to a video format signal and a coded information signal, graphic codes including picture information are recorded as the subcode of said coded information signal, said apparatus comprising:

reading means for recovering signals recorded on said recording medium;

demodulating means for demodulating a video format signal component contained in a read-out signal obtained by said reading means;

extracting means for extracting said graphic codes from said coded information signal contained in said read-out signal;

reading timing signal generating means for generating a reading timing signal which has a time relationship determined by a command with respect to horizontal and vertical sync signals contained in said video format signal demodulated by said demodulating means, wherein said reading timing signal generating means displays the subcode image within a portion of the display designated by commands from an operating part;

a memory;

memory control means for sequentially writing said graphic codes output from said extracting means into said memory and sequentially reading out said graphic codes in a predetermined order by using said reading timing signal;

picture signal deriving means for deriving a picture signal corresponding to said graphic codes output by means of said memory control means; and mixing mean for mixing said picture signal with said video format signal output from said demodulating means.

3. The apparatus of claim 2, wherein horizontal and vertical enable signals, based upon timing setting data and horizontal and vertical scanning periods, respectively constitute said reading timing signal.

4. The apparatus of claim 2, wherein said reading timing signal generating means further comprises:

timing setting data generating means for generating first and second timing setting data dependent upon said operating part commands;

first and second predetermined data generating means for generating data related to horizontal and vertical scanning periods, respectively;

first and second adders for adding said first and second timing setting data to said first and second predetermined data, respectively;

means for generating said reading timing signals based upon said horizontal and vertical sync signals data and said first and second timing setting data.

* * * * *